(12) United States Patent
Igarashi

(10) Patent No.: US 9,115,625 B2
(45) Date of Patent: Aug. 25, 2015

(54) EXHAUST EMISSION CONTROL DEVICE

(75) Inventor: Tatsuki Igarashi, Tokyo (JP)

(73) Assignee: HINO MOTORS, LTD., Hino-shi (JP)

( * ) Notice: Subject to any disclaimer, the term of this patent is extended or adjusted under 35 U.S.C. 154(b) by 208 days.

(21) Appl. No.: 13/640,549

(22) PCT Filed: Apr. 26, 2011

(86) PCT No.: PCT/JP2011/002441
§ 371 (c)(1),
(2), (4) Date: Oct. 11, 2012

(87) PCT Pub. No.: WO2011/135845
PCT Pub. Date: Nov. 3, 2011

(65) Prior Publication Data
US 2013/0028806 A1    Jan. 31, 2013

(30) Foreign Application Priority Data
Apr. 28, 2010  (JP) .................................. 2010-103059

(51) Int. Cl.
| F01N 3/035 | (2006.01) |
| F01N 3/28 | (2006.01) |
| F01N 3/10 | (2006.01) |
| F01N 3/20 | (2006.01) |
| F01N 3/025 | (2006.01) |
| F01N 13/00 | (2010.01) |

(52) U.S. Cl.
CPC .............. *F01N 3/2066* (2013.01); *F01N 3/025* (2013.01); *F01N 3/035* (2013.01); *F01N 3/106* (2013.01); *F01N 3/2033* (2013.01); *F01N 13/009* (2014.06); *F01N 2240/14* (2013.01); *F01N 2390/00* (2013.01); *F01N 2410/00* (2013.01); *Y02T 10/24* (2013.01); *Y02T 10/26* (2013.01)

(58) Field of Classification Search
None
See application file for complete search history.

(56) References Cited

U.S. PATENT DOCUMENTS

| 2004/0011026 | A1* | 1/2004 | Nakatani .......................... 60/286 |
| 2004/0098979 | A1* | 5/2004 | Hammerle et al. ............. 60/295 |
| 2005/0000209 | A1* | 1/2005 | Takahashi et al. ............... 60/286 |
| 2006/0153761 | A1* | 7/2006 | Bandl-Konrad et al. .. 423/239.1 |
| 2010/0178216 | A1* | 7/2010 | Honda et al. ................... 422/171 |

(Continued)

FOREIGN PATENT DOCUMENTS

| JP | 2006 226216 | 8/2006 |
| JP | 2009 68424 | 4/2009 |

(Continued)

OTHER PUBLICATIONS

International Search Report Issued Jul. 19, 2011 in PCT/JP11/002441 Filed Apr. 26, 2011.

*Primary Examiner* — Walter D Griffin
*Assistant Examiner* — Jelitza Perez
(74) *Attorney, Agent, or Firm* — Oblon, McClelland, Maier & Neustadt, L.L.P.

(57) ABSTRACT

An exhaust emission control device with a particulate filter and a selective reduction catalyst (exhaust purification catalyst) incorporated in an exhaust pipe such that the former and the latter are arranged on downstream and upstream sides, respectively, has a burner for generating high-temperature exhaust gas by combustion, an exhaust distribution pipe capable of guiding the exhaust gas from the burner to entry sides of the filter and the catalyst, respectively, and valves as a path switcher in the pipe for selectively sorting the exhaust gas from the burner any one of the entry sides of the filter and the catalyst.

6 Claims, 2 Drawing Sheets

(56) References Cited

U.S. PATENT DOCUMENTS

2010/0180579 A1* 7/2010 Huang et al. .............. 60/297
2010/0205944 A1* 8/2010 Torisaka et al. ........... 60/297
2011/0203261 A1* 8/2011 Kotrba et al. .............. 60/285

FOREIGN PATENT DOCUMENTS

| JP | 2009 91909 | 4/2009 |
| JP | 2010 090853 | 4/2010 |
| JP | 2010 156277 | 7/2010 |

* cited by examiner

EXHAUST EMISSION CONTROL DEVICE

TECHNICAL FIELD

The present invention relates to an exhaust emission control device.

BACKGROUND ART

Conventionally, some diesel engines have selective reduction catalyst incorporated in an exhaust pipe for flow of exhaust gas, the selective reduction catalyst having a property of selectively reacting $NO_x$ with a reducing agent even in the presence of oxygen. A required amount of reducing agent is added upstream of the reduction catalyst and is reacted on the catalyst with $NO_x$ (nitrogen oxides) in the exhaust gas to thereby reduce a concentration of the discharged $NO_x$.

In a field of industrial plant or the like with flue-gas denitration, it has been well known that ammonia ($NH_3$) is effectively used as reducing agent to reduce and depurate $NO_x$. However, for automobiles, safety in carrying ammonia itself during travel is difficult to ensure, so that in recent years, use of nontoxic urea water as reducing agent has been in practical use. More specifically, if the urea water is added to the exhaust gas upstream of the selective reduction catalyst, the urea water is thermally decomposed in the exhaust gas into ammonia and carbon dioxide gas, and $NO_x$ in the exhaust gas is satisfactorily reduced and depurated by ammonia on the catalyst.

On the other hand, for exhaust emission control of a diesel engine, it is insufficient to remove only $NO_x$ in the exhaust gas; particulates (particulate matters) in the exhaust gas must be captured through a particulate filter. However, the exhaust gas from the diesel engine in a normal operation state rarely has a chance to obtain a temperature level at which the particulates combust by themselves; an oxidation catalyst having active species such as Pt and Pd is integrally carried by the particulate filter. Specifically, employment of such particulate filter carrying the oxidation catalyst facilitates an oxidation reaction of the captured particulates to lower an ignition temperature, so that the particulates can be removed by combustion even at an exhaust gas temperature lower than ever before.

However, even if such particulate filter is employed, an amount of captured particulates will exceed an amount of treated particulates in operation areas with low exhaust temperature levels. Continued operation with such low exhaust temperature levels may hinder satisfactory regeneration of the particulate filter, resulting in excessive accumulation of the captured particulates in the particulate filter.

Thus, it has been conceived to additionally arrange a flow-through type oxidation catalyst in front of the particulate filter; with accumulation of the particulates becoming increased, fuel is added to the exhaust gas upstream of the oxidation catalyst to forcibly regenerate the particulate filter.

Specifically, the fuel (HC) added upstream of the particulate filter undergoes the oxidation reaction during its passage through the frontward oxidation catalyst. The exhaust gas heated by heat of the reaction and flowing into the particulate filter just behind increases a catalyst bed temperature of the particulate filter to burn off the particulates, thereby regenerating the particulate filter.

However, in a vehicle such as a city shuttle-bus with travel pattern of traveling on congested roads for a long time, the frontward oxidation catalyst hardly has an elevated catalyst bed temperature enough for sufficient catalytic activity and thus an activated oxidation reaction of the added fuel in the oxidation catalyst, failing in effective regeneration of the particulate filter within a short time.

Thus, as shown in FIG. 1, it has been studied to arrange a burner 2 on an entry side of a particulate filter 1 incorporated in an exhaust pipe 10 and burn off captured particulates by combustion with the burner 2 regardless of an operating state of a vehicle, thereby efficiently regenerating the particulate filter 1 within a short time.

In the example illustrated in FIG. 1, the burner 2 includes a fuel injection nozzle 3 for injection of a proper amount of fuel from a fuel tank (not shown) and an ignition plug 4 for ignition of the fuel injected through an injection port of the nozzle. Connected to the burner 2 is a combustion air supply pipe 5 branched downstream from a compressor (not shown) of a turbocharger such that a part of the intake air is guided as combustion air.

Further, arranged downstream of the particulate filter 1 is a selective reduction catalyst 6 with a property capable of selectively reacting $NO_x$ with ammonia even in the presence of oxygen. Arranged on an entry side of the selective reduction catalyst 6 is an urea water injector 8 so as to add urea water from an urea water tank (not shown) into an exhaust gas 7. Arranged between an added position of the urea water by the injector 8 and the selective reduction catalyst 6 is a gas mixer 9 so as to facilitate mixing of the urea water with the exhaust gas 7.

In the example illustrated, further arranged between the added position of the urea water by the injector 8 and the particulate filter 1 is an oxidation catalyst 11 which facilitates oxidation reaction of NO in the exhaust gas 7 into $NO_2$. Arranged just behind the selective reduction catalyst 6 is an oxidation catalyst 12 for oxidation reaction of excessive ammonia.

There exist the following Patent Literatures 1 and 2 as prior art document information relating to this kind of technique on exhaust purification catalyst or on heating of exhaust gas by use of a burner.

CITATION LIST

Patent Literature

[Patent Literature 1] JP 2009-068424A
[Patent Literature 2] JP 2009-091909A

SUMMARY OF INVENTION

Technical Problems

In some instances such as cold starting, the burner 2 used for forcible regeneration of the particulate filter 1 is desired to be used also for elevation in temperature of the selective reduction catalyst 6 up to an active temperature range. However, in a layout as shown in FIG. 1 which gives preference to the forcible regeneration of the particulate filter 1, the particulate filter 1 with a great heat capacity is intervened between the burner 2 and the selective reduction catalyst 6, so that the selective reduction catalyst 6 cannot be elevated in temperature especially in an idling or other operation state having a low flow rate of exhaust gas, until the particulate filter 1 is sufficiently warmed. Thus, disadvantageously, the selective reduction catalyst 6 cannot be early elevated in temperature up to the active temperature range.

The invention was made in view of the above and has its object to provide an exhaust emission control device which can satisfactorily perform not only forcible regeneration of a particulate filter but also temperature elevation of an exhaust purification catalyst.

Solution to Problems

The invention is directed to an exhaust emission control device with a particulate filter and an exhaust purification catalyst incorporated in an exhaust pipe such that one and the other of the particulate filter and exhaust purification catalyst are arranged on upstream and downstream sides, respectively, comprising a burner for generating high-temperature exhaust gas by combustion, an exhaust distribution pipe capable of guiding the exhaust gas from the burner to entry sides of the particulate filter and the exhaust purification catalyst, respectively, and path switching means in the exhaust distribution pipe for selectively sorting the exhaust gas from the burner any one of the entry sides of the particulate filter and the exhaust purification catalyst.

Thus, when the particulate filter is desired to be forcibly regenerated, the burner is ignited to generate high-temperature exhaust gas which is directly guided to the entry side of the particulate filter through switching of paths of the exhaust distribution pipe by the path switching means. Thus, the particulate filter can be efficiently regenerated within a short time.

When the temperature of the exhaust purification catalyst is desired to be elevated up to an active temperature range in cold starting or the like, the burner is ignited to generate high-temperature exhaust gas which is directly guided to the entry side of the exhaust purification catalyst through switching of paths of the exhaust distribution pipe by the path switching means. Thus, the high-temperature exhaust gas is directly guided to the exhaust purification catalyst without through the particulate filter having a large heat capacity, so that the temperature of the exhaust gas is efficiently elevated up to the active temperature range within a short time.

According to the invention, the exhaust purification catalyst may be arranged on an upstream side in the exhaust pipe, and the particulate filter may be arranged downstream of the exhaust purification catalyst. Alternatively, the particulate filter may be arranged on the upstream side in the exhaust pipe, and the exhaust purification catalyst may be arranged downstream of the particulate filter.

When the exhaust purification catalyst is arranged on the upstream side in the exhaust pipe, the fact that the catalyst is arranged on the upstream side having a high exhaust gas temperature facilitates to keep catalytic activity and thus facilitates an exhaust purification reaction. When the particulate filter is arranged on the upstream side in the exhaust pipe, the fact that the particulate filter is arranged on the upstream side having a high exhaust gas temperature facilitates spontaneous regeneration of the captured particulates.

Advantageous Effects of Invention

The exhaust emission control device of the invention can afford the following excellent effects and advantages. Regardless of a travelling state of a vehicle, captured particulates can be reliably burned off by the high temperature exhaust gas obtained by the combustion with the burner, and the particulate filter can be efficiently regenerated within a short time. Further, with respect to the selective reduction catalyst, the high-temperature exhaust gas from the burner can be directly guided to the entry side of the selective reduction catalyst without through the particulate filter to satisfactorily elevate the temperature of the selective reduction catalyst. The selective reduction catalyst early elevated in temperature to an active temperature range can reliably exert the exhaust gas purification capability.

DESCRIPTION OF EMBODIMENTS

Embodiments of the invention will be described with reference to the drawings.

Figure 2:
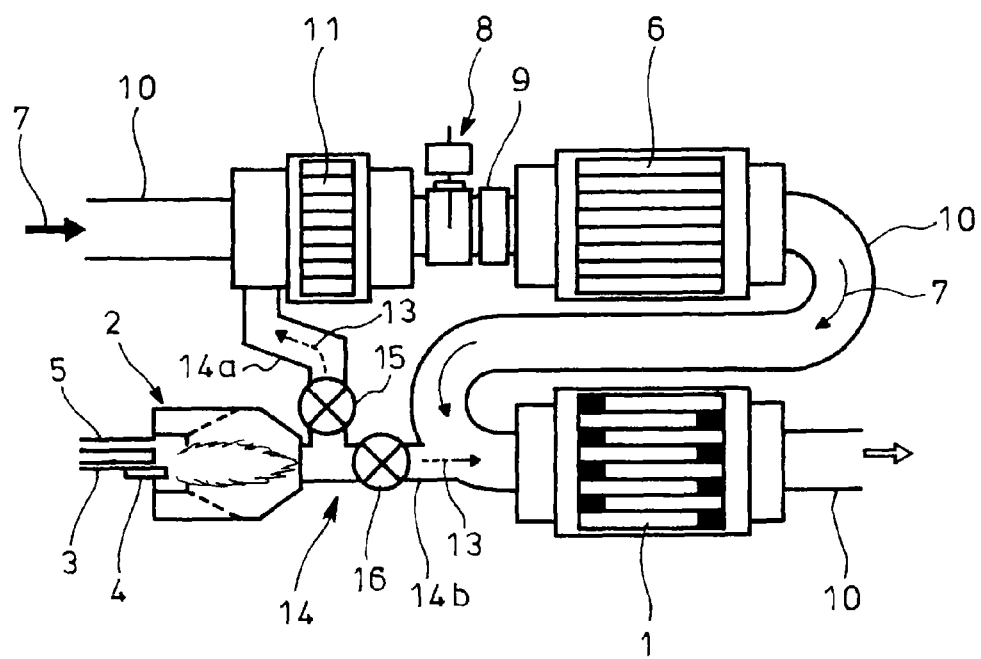
FIG. 2 is a schematic view showing a first embodiment of the invention.

FIG. 2 shows a first embodiment of the invention. In the embodiment illustrated, incorporated in parallel with each other in an exhaust pipe 10 for flow of exhaust gas 7 from a diesel engine are a selective reduction catalyst 6 with a property capable of selectively reacting $NO_x$ with ammonia even in the presence of oxygen and a particulate filter 1 which is arranged downstream of the catalyst 6 and captures particulates in the exhaust gas 7. A discharge end of the selective reduction catalyst 6 is connected to an entry end of the particulate filter 1 by an S-shaped exhaust pipe 10 such that the exhaust gas 7 discharged from the discharge end of the catalyst 6 is reversely turned around to the entry end of the adjacent particulate filter 1.

Arranged on the entry side of the selective reduction catalyst 6 in the exhaust pipe 10 is an urea water injector 8 so as to add the urea water from a urea water tank (not shown) into the exhaust gas 7. Arranged between an added position of the urea water by the injector 8 and the selective reduction catalyst 6 is a gas mixer 9 so as to facilitate mixing of the urea water with the exhaust gas 7. Further arranged upstream of the urea water injector 8 is an oxidation catalyst 11 which facilitates an oxidation reaction of NO in the exhaust gas 7 into $NO_2$.

A burner 2 capable of generating high-temperature exhaust gas 13 by combustion is arranged adjacent to the particulate filter 1 and selective reduction catalyst 6 and independently of the exhaust pipe 10 such that the high-temperature exhaust gas 13 generated by the combustion with the burner 2 is guided to each of the oxidation catalyst 11 and the particulate filter 1 through an exhaust distribution pipe 14.

Figure 1:
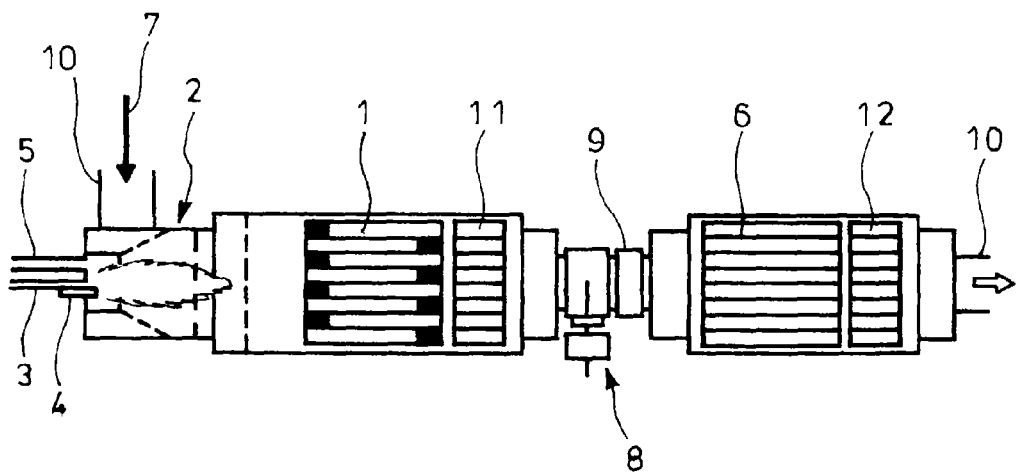
FIG. 1 is a schematic view showing a conventional example.

Like the example shown in FIG. 1, the burner 2 includes a fuel injection nozzle 3 which injects a proper amount of fuel from a fuel tank (not shown) and an ignition plug 4 to ignite the fuel injected from an injection port of the nozzle 3. A combustion air supply pipe 5 branched downstream from a compressor (not shown) of a turbocharger is connected to the burner 2 to guide a part of intake air as air for combustion. Alternatively, the combustion air supply pipe 5 may guide the air by arranging a dedicated blower.

The exhaust distribution pipe 14 is branched biforkedly from an outlet of the burner 2 and connected to each of the entry sides of the oxidation catalyst 11 and particulate filter 1. Arranged at branched portions as path switching means are a valve 15 which opens/closes a branched path 14a directed to the entry side of the oxidation catalyst 11 and a valve 16 which opens/closes a branched path 14b directed to the entry side of the particulate filter 1.

Thus, when the particulate filter 1 is to be forcibly regenerated, the burner 2 is ignited to generate the high-temperature exhaust gas 13 which is directly guided to the entry side of the particulate filter 1 by closing and opening the valves 15 and 16, respectively, so that the high-temperature exhaust gas 13 is guided to the particulate filter 1 without through the oxidation catalyst 11 having a great heat capacity and the selective reduction catalyst 6, whereby the particulate filter 1 is efficiently regenerated within a short time.

When the temperature of the selective reduction catalyst 6 is to be elevated up to an active temperature range in cold starting or the like, the burner 2 is ignited to generate the high-temperature exhaust gas 13 which is guided to the entry side of the oxidation catalyst 11 by opening and closing the valves 15 and 16, respectively, so that the high-temperature exhaust gas 13 is guided to the selective reduction catalyst 6 without through the particulate filter 1 having the great heat capacity, whereby the temperature is efficiently elevated up to the active temperature range within a short time.

Guiding the high-temperature exhaust gas 13 to the entry side of the oxidation catalyst 11 aims at elevating the temperature of the oxidation catalyst 11 as well up to the active temperature range. When the activity of the oxidation catalyst 11 is elevated, an oxidation reaction of NO in the exhaust gas 7 into $NO_2$ is facilitated to increase a ratio of highly reactive $NO_2$, so that a reduction reaction with a high reaction rate on the selective reduction catalyst 6 is facilitated to satisfactorily reduce $NO_x$.

Specifically, the urea water added to the selective reduction catalyst 6 receives heat in the exhaust gas 7 after the addition, and is decomposed into ammonia and carbon dioxide gas according to the following formula:

$$(NH_2)_2CO + H_2O \rightarrow 2NH_3 + CO_2 \quad \text{chemical formula 1}$$

Thus, $NO_R$ is reduced and depurated by the ammonia obtained. When $NO_2$ is increased by the oxidation catalyst 11 to NO constituting the majority of $NO_x$ in the exhaust gas 7, a reduction reaction with highest reaction rate given by the following formula:

$$NO + NO_2 + 2NH_3 \rightarrow 2N_2 + 3H_2O \quad \text{chemical formula 2}$$

is facilitated to satisfactorily reduce $NO_x$.

For the facilitation of the reduction reaction, it is important that an $NO/NO_2$ ratio in the exhaust gas 7 is close to about 1-1.3.

Incidentally, if there is no facilitated oxidation reaction of NO into $NO_2$ by the oxidation catalyst 11, the $NO_x$ in the exhaust gas 7 will be mainly constituted by NO, so that $NO_x$ in the exhaust gas 7 is reduced and depurated according to the following formula:

$$6NO + 4NH_3 \rightarrow 5N_2 + 6H_2O \quad \text{chemical formula 3}$$

or the following formula:

$$4NO + 4NH_3 + O_2 \rightarrow 4N_2 + 6H_2O \quad \text{chemical formula 4}$$

Then, needless to say, the reaction rate slows down in comparison with the case of the $NO/NO_2$ ratio in the exhaust gas 7 being about 1-1.3.

In the first embodiment shown in FIG. 2, a configuration employed is such that the selective reduction catalyst 6 is arranged on an upstream side in the exhaust pipe 10 and the particulate filter 1 is arranged downstream of the selective reduction catalyst 6. The arrangement of the selective reduction catalyst 6 on the upstream side having a high exhaust temperature facilitates keeping the catalytic activity to facilitate an exhaust purification reaction on the catalyst.

As described in the above, according to the embodiment, regardless of a travelling state of a vehicle, captured particulates can be reliably burned off by the high-temperature exhaust gas 13 obtained by the combustion with the burner 2, and the particulate filter 1 can be efficiently regenerated within a short time. Further, with respect to the selective reduction catalyst 6, the high-temperature exhaust gas 13 from the burner 2 can be directly guided to the entry side of the selective reduction catalyst 6 without through the particulate filter 1 to satisfactorily elevate the temperature of the selective reduction catalyst 6. The selective reduction catalyst 6 early elevated in temperature to an active temperature range can reliably exert the exhaust gas purification capability of selectively reacting $NO_x$ with ammonia even in the presence of oxygen to satisfactorily reduce and depurate $NO_x$.

Figure 3:
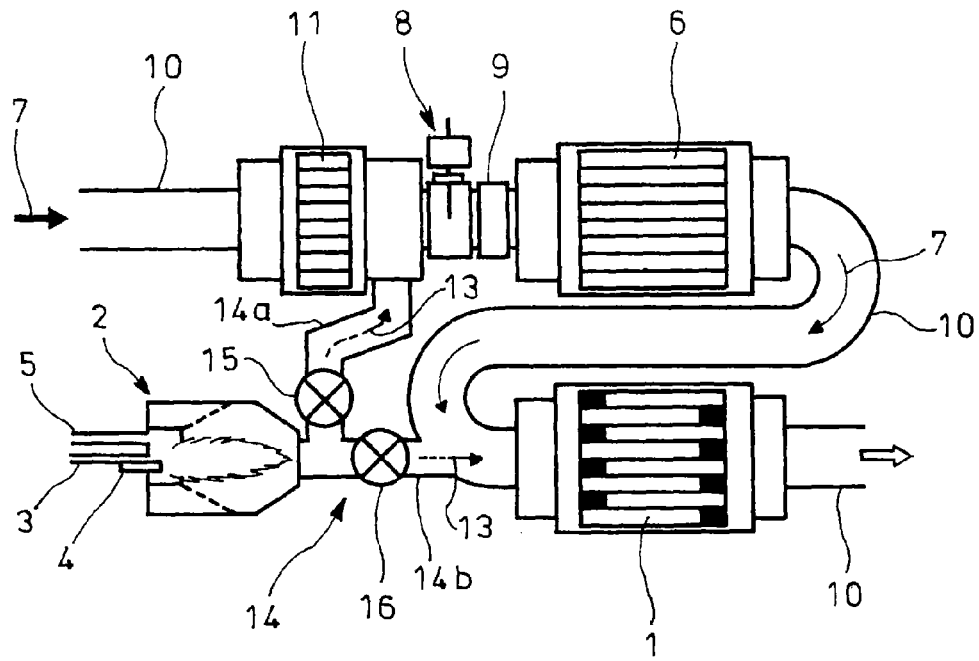
FIG. 3 is a schematic view showing a second embodiment of the invention.

FIG. 3 shows a second embodiment of the invention. The embodiment illustrated here is different from the first embodiment in that the branched path 14a of the exhaust distribution pipe 14, which is connected in the first embodiment described above and shown in FIG. 2 to the entry side of the oxidation catalyst 11, is connected to the discharge side of the oxidation catalyst 11 to guide exhaust gas to the selective reduction catalyst 6 without through the oxidation catalyst 11.

Such configuration is suitable for at least some of recent diesel engines equipped with an EGR device (diesel engines equipped with the mechanism which recirculates part of the exhaust gas 7 from the exhaust side to the intake side). More specifically, some of the diesel engines with the EGR device of this type have an engine characteristic of increasing a ratio of $NO_2$ when the exhaust gas 7 is recirculated in a light-load operation state having a low exhaust gas temperature and requiring elevation in temperature of the selective reduction catalyst 6. In the engine having such engine characteristic, there is no specific need of increasing the activity of the oxidation catalyst 11 for increase of the ratio of $NO_2$; thus, it is rational to give a top preference to an increase in temperature of the selective reduction catalyst 6.

Needless to say, to increase the ratio of $NO_2$ by the oxidation catalyst 11 is effective in operation states other than the light-load operation where the ratio of $NO_2$ becomes not high by recirculation of the exhaust gas 7.

Figure 4:
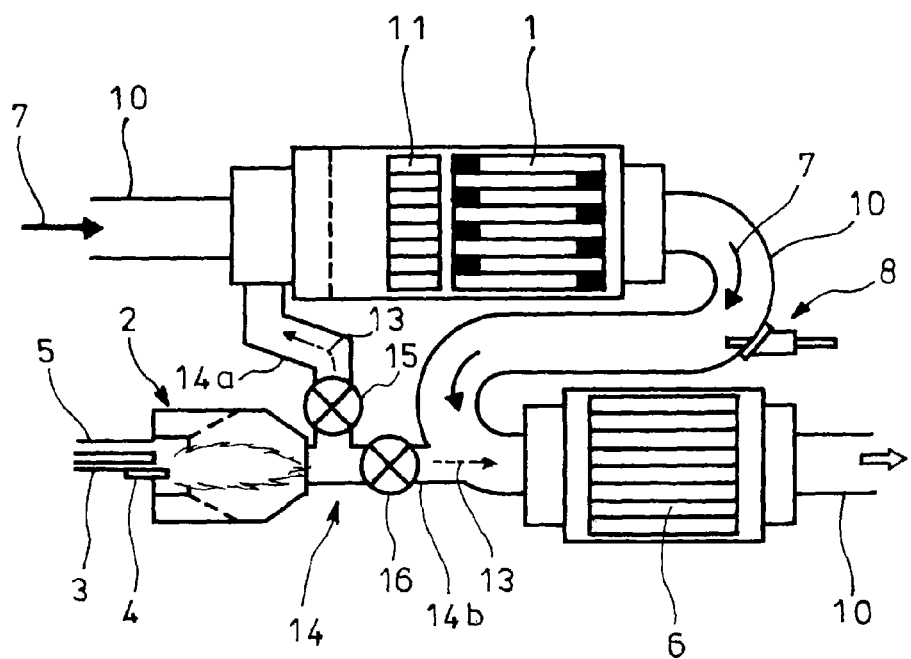
FIG. 4 is a schematic view showing a third embodiment of the invention.

FIG. 4 shows a third embodiment of the invention. In the embodiment illustrated here, the selective reduction catalyst 6 and the particulate filter 1 are arranged reversely to those in the first or second embodiment described above. That is, the particulate filter 1 is arranged on an upstream side in the exhaust pipe 10 and the selective reduction catalyst 6 is arranged downstream of the particulate filter 1.

Incorporated in the S-shaped exhaust pipe 10 which connects the discharge end of the particulate filter 1 with the entry end of the selective reduction catalyst 6 is the urea water injector 8 so as to add urea water guided from an urea water tank (not shown) into the exhaust gas 7.

In the embodiment illustrated here, the oxidation catalyst 11 which facilitates an oxidation reaction of NO in the exhaust gas 7 into $NO_2$ is arranged near the inlet of the particulate filter 1, and the branched path 14a of the exhaust distribution pipe 14 is connected to the entry side of the oxidation catalyst 11.

Such configuration is suitable for a case where the frequency of forcible regeneration is desired to be reduced by preferentially performing spontaneous regeneration of the particulate filter 1. More specifically, when the particulate filter 1 is arranged on the upstream side having a high exhaust gas temperature, captured particulates are easily burned off to facilitate spontaneous regeneration. In addition, in the embodiment shown in FIG. 4, highly reactive $NO_2$ is generated by the oxidation catalyst 11 near the inlet of the particulate filter 1, so that an oxidation atmosphere in the particulate filter 1 is enhanced to further facilitate spontaneous regeneration.

It is to be understood that an exhaust emission control device according to the invention is not limited to the embodiments described above and that various changes and modifications may be made without departing from the spirit and scope of the invention. For example, though the first to third embodiments shown in FIGS. 2 to 4 have been described with respect to a case where an oxidation catalyst for facilitation of an oxidation reaction of NO in exhaust gas into $NO_2$ is arranged upstream of the selective reduction catalyst or the particulate filter, a configuration may be employed with this kind of oxidation catalyst being omitted. As the exhaust purification catalyst, other than the selective reduction catalyst, usable is an $NO_x$-absorbing reduction catalyst or the like which oxidizes $NO_x$ in exhaust gas when an air/fuel ratio of the exhaust gas is lean to thereby temporarily absorb $NO_x$ as a nitrate, and decomposes and discharges $NO_x$ through interposition of unburned HC or CO or the like when an $O_2$ concentration in the exhaust gas is lowered to thereby perform reduction and depuration.

REFERENCE SIGNS LIST 1 particulate filter
2 burner
6 selective reduction catalyst (exhaust purification catalyst)
10 exhaust pipe
13 exhaust gas
14 exhaust distribution pipe
15 valve (path switching means)
16 valve (path switching means)

The invention claimed is:

1. An exhaust emission control device, comprising:
an exhaust pipe in which exhaust gas flows,
an exhaust purification catalyst arranged on an upstream side of the exhaust pipe,
a particulate filter arranged in parallel with and downstream of the exhaust purification catalyst,
an oxidation catalyst arranged upstream of an entry end of the exhaust purification catalyst for facilitating an oxidation reaction of NO in the exhaust gas into $NO_2$,
a urea water injector arranged downstream of the oxidation catalyst for adding urea water into the exhaust gas,
a burner for generating high-temperature exhaust gas by combustion,
an exhaust distribution pipe capable of guiding the exhaust gas from the burner to entry sides of the particulate filter and the exhaust purification catalyst, respectively, and
path switching valves in the exhaust distribution pipe for selectively sorting the exhaust gas from the burner any one of the entry sides of the particulate filter and the exhaust purification catalyst,
wherein the exhaust pipe is S-shaped for interconnecting a discharge end of the exhaust purification catalyst and an entry end of the particulate filter,
wherein the burner is arranged adjacent to the entry end of the exhaust purification catalyst and the entry end of the particulate filter and independently of the exhaust pipe, and
wherein an end of a branch of the exhaust distribution pipe is arranged downstream of the oxidation catalyst and upstream of the urea water injector.

2. The exhaust emission control device as claimed in claim 1, wherein the urea water injector is arranged upstream of the entry end of the exhaust purification catalyst and upstream of the entry end of the particulate filter.

3. The exhaust emission control device as claimed in claim 1, wherein the urea water injector is arranged in the S-shaped exhaust pipe.

4. The exhaust emission control device as claimed in claim 1, wherein the urea water injector is arranged downstream of the oxidation catalyst and upstream of the exhaust purification catalyst.

5. The exhaust emission control device as claimed in claim 1, wherein, during regeneration of the particulate filter, a first path switching valve for selectively sorting the exhaust gas from the burner to the entry side of the exhaust purification catalyst is closed and a second path switching valve for selectively sorting the exhaust gas from the burner to the entry side of the particulate filter is open.

6. The exhaust emission control device as claimed in claim 5, wherein, when the exhaust purification catalyst is elevated up to an active temperature range, the first path switching valve is open and the second path switching valve is closed.

* * * * *